US012635595B1

(12) United States Patent　　　　　(10) Patent No.:　US 12,635,595 B1
Bastian et al.　　　　　　　　　　　(45) Date of Patent:　　　May 26, 2026

(54) SEED QUALITY ANALYSIS USING COMPUTED TOMOGRAPHY

(71) Applicant: Lumafield, Inc., Cambridge, MA (US)

(72) Inventors: Andreas Linas Bastian, San Francisco, CA (US); Sondre Skatter, Oakland, CA (US); Steven Thomas, Somerville, MA (US)

(73) Assignee: Lumafield, Inc., Cambridge, MA (US)

( * ) Notice: Subject to any disclaimer, the term of this patent is extended or adjusted under 35 U.S.C. 154(b) by 0 days.

(21) Appl. No.: 19/282,915

(22) Filed: Jul. 28, 2025

(51) Int. Cl.
　　*G06T 7/00*　　　(2017.01)
　　*A01C 1/02*　　　(2006.01)
　　　　　(Continued)

(52) U.S. Cl.
　　CPC ............... *A01C 1/025* (2013.01); *G06T 3/40* (2013.01); *G06T 7/0012* (2013.01); *G06T 7/64* (2017.01); *G06V 10/25* (2022.01); *G06V 10/26* (2022.01); *G06V 10/762* (2022.01); *G06V 10/764* (2022.01); *G06V 10/774* (2022.01); *G06T 2207/10081* (2013.01);
　　　　　(Continued)

(58) Field of Classification Search
　　CPC ......... A01C 1/025; G06T 3/40; G06T 7/0012; G06T 7/64; G06T 2207/10081; G06T 2207/20021; G06T 2207/20081; G06T 2207/30188; G06V 10/25; G06V 10/26; G06V 10/762; G06V 10/764; G06V 10/774
　　See application file for complete search history.

(56) References Cited

U.S. PATENT DOCUMENTS

2013/0000194 A1*　1/2013　Wolff ..................... A01C 1/025
　　　　　　　　　　　　　　　　　　　702/19
2013/0021469 A1*　1/2013　Conrad ................... A01G 7/00
　　　　　　　　　　　　　　　　　　　382/110

(Continued)

FOREIGN PATENT DOCUMENTS

EP　　　　　2588255 B1　　2/2015

OTHER PUBLICATIONS

Busa-Fekete et al., "Easy Learning from Label Proportions," Paper, 37th Conference on Neural Information Processing Systems (NeurIPS 2023), 2023, 19 pages.

(Continued)

*Primary Examiner* — Bobbak Safaipour
(74) *Attorney, Agent, or Firm* — Fish & Richardson P.C.

(57)　　　　　ABSTRACT

Provided herein are methods, apparatuses, computer program products, and systems for seed quality analysis using computed tomography. One method can include obtaining computed tomography data representing a germination towel including seedlings; detecting likely seeds and candidate shoots and roots in the computed tomography data representing the germination towel; forming segments from the candidate shoots and roots; grouping the segments across a total volume of the computed tomography data into likely shoots and roots in accordance with relative proximity and alignment of the segments; assembling the likely seeds and the likely shoots and roots into likely seedlings; classifying the germination towel using a classifier trained to use at least the likely seedlings, as input; and providing a classification result from the classifying for the germination towel.

30 Claims, 9 Drawing Sheets

(51) Int. Cl.

| | |
|---|---|
| *G06T 3/40* | (2006.01) |
| *G06T 7/64* | (2017.01) |
| *G06V 10/25* | (2022.01) |
| *G06V 10/26* | (2022.01) |
| *G06V 10/762* | (2022.01) |
| *G06V 10/764* | (2022.01) |
| *G06V 10/774* | (2022.01) |

(52) U.S. Cl.
CPC .............. *G06T 2207/20021* (2013.01); *G06T 2207/20081* (2013.01); *G06T 2207/30188* (2013.01)

(56) References Cited

U.S. PATENT DOCUMENTS

| | | | |
|---|---|---|---|
| 2013/0126399 A1* | 5/2013 | Wolff | ....................... B07C 5/342 209/555 |
| 2013/0294656 A1* | 11/2013 | Conrad | ................ G01N 21/253 47/1.01 R |

OTHER PUBLICATIONS phenoLytics [online], "High-Throughput 3D Phenotyping," available on or before Apr. 1, 2022, via Internet Archive: Wayback Machine URL <https://web.archive.org/web/20220401034148/https://www.phenolytics.eu/#phenoCheck>, retrieved on Jun. 28, 2025 from URL <https://www.phenolytics.eu/#phenoCheck>, 11 pages.

robovision.com [online], "Smarter Agriculture with Computer Vision AI," available on or before Nov. 7, 2024, via Internet Archive: WayBack Machine URL <https://web.archive.org/web/20241107221957/https://robovision.ai/what-we-do/agriculture>, retrieved on Jul. 28, 2025, retrieved from URL <https://robovision.ai/what-we-do/agriculture>, 14 pages.

wikipedia.com [online], "Blob detection," available on or before Sep. 13, 2006, via Internet Archive: Wayback Machine URL <https://web.archive.org/web/20060913000000/https://en.wikipedia.org/wiki/Blob_detection>, retrieved on Jun. 29, 2025, retrieved from URL <https://en.wikipedia.org/wiki/Blob_detection>, 9 pages.

wikipedia.com [online], "Hessian matrix," available on or before Apr. 11, 2004, via Internet Archive: Wayback Machine URL <https://web.archive.org/web/20040411041440/https://en.wikipedia.org/wiki/Hessian_matrix>, retrieved on Jul. 10, 2025, retrieved from URL <https://en.wikipedia.org/wiki/Hessian_matrix>, 6 pages.

wikipedia.com [online], "Laplace operator," available on or before Jan. 26, 2004, via Internet Archive: Wayback Machine URL <https://web.archive.org/web/20040126130019/https://en.wikipedia.org/wiki/Laplace_operator>, retrieved on Jul. 10, 2025, retrieved from URL <https://en.wikipedia.org/wiki/Laplace_operator>, 12 pages.

* cited by examiner

206

208

204a

202

204b

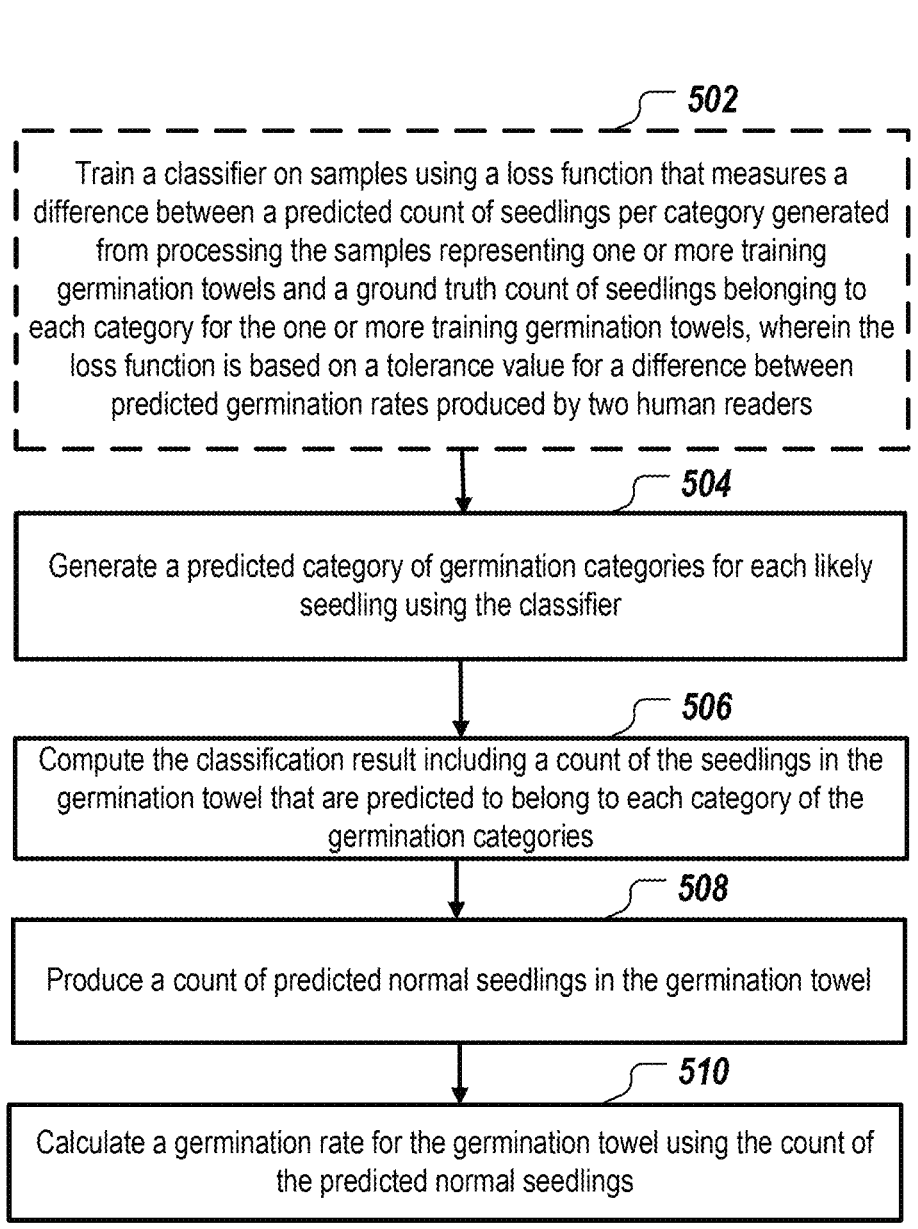

500a

502

Train a classifier on samples using a loss function that measures a difference between a predicted count of seedlings per category generated from processing the samples representing one or more training germination towels and a ground truth count of seedlings belonging to each category for the one or more training germination towels, wherein the loss function is based on a tolerance value for a difference between predicted germination rates produced by two human readers

504

Generate a predicted category of germination categories for each likely seedling using the classifier

506

Compute the classification result including a count of the seedlings in the germination towel that are predicted to belong to each category of the germination categories

508

Produce a count of predicted normal seedlings in the germination towel

510

Calculate a germination rate for the germination towel using the count of the predicted normal seedlings

FIG. 5A

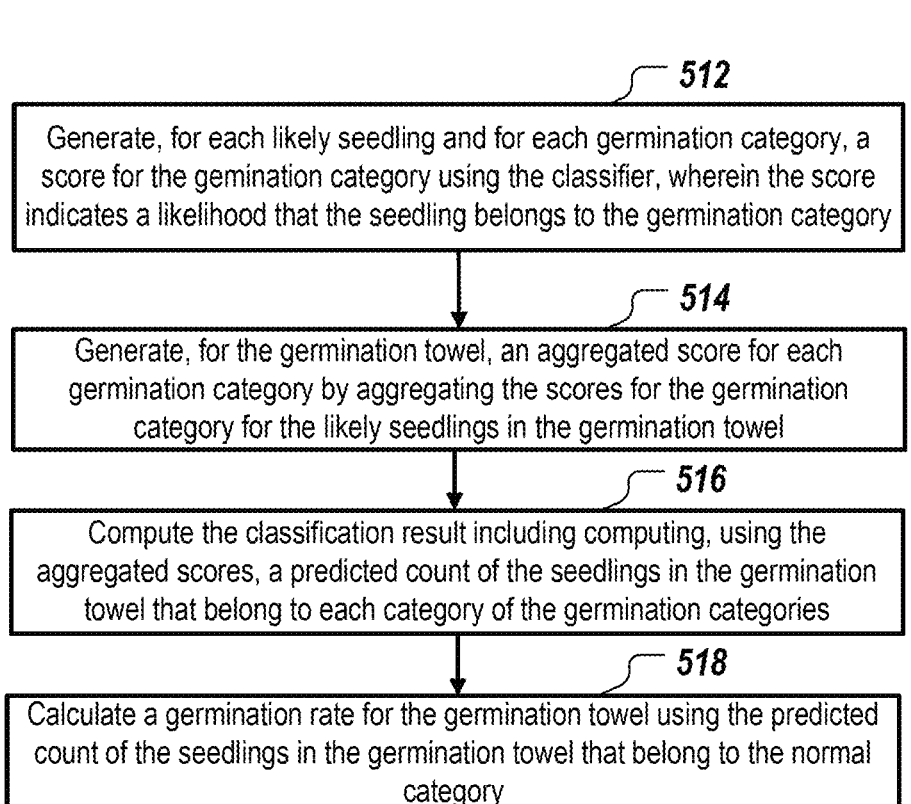

*512*

Generate, for each likely seedling and for each germination category, a score for the gemination category using the classifier, wherein the score indicates a likelihood that the seedling belongs to the germination category

*514*

Generate, for the germination towel, an aggregated score for each germination category by aggregating the scores for the germination category for the likely seedlings in the germination towel

*516*

Compute the classification result including computing, using the aggregated scores, a predicted count of the seedlings in the germination towel that belong to each category of the germination categories

*518*

Calculate a germination rate for the germination towel using the predicted count of the seedlings in the germination towel that belong to the normal category

FIG. 5B

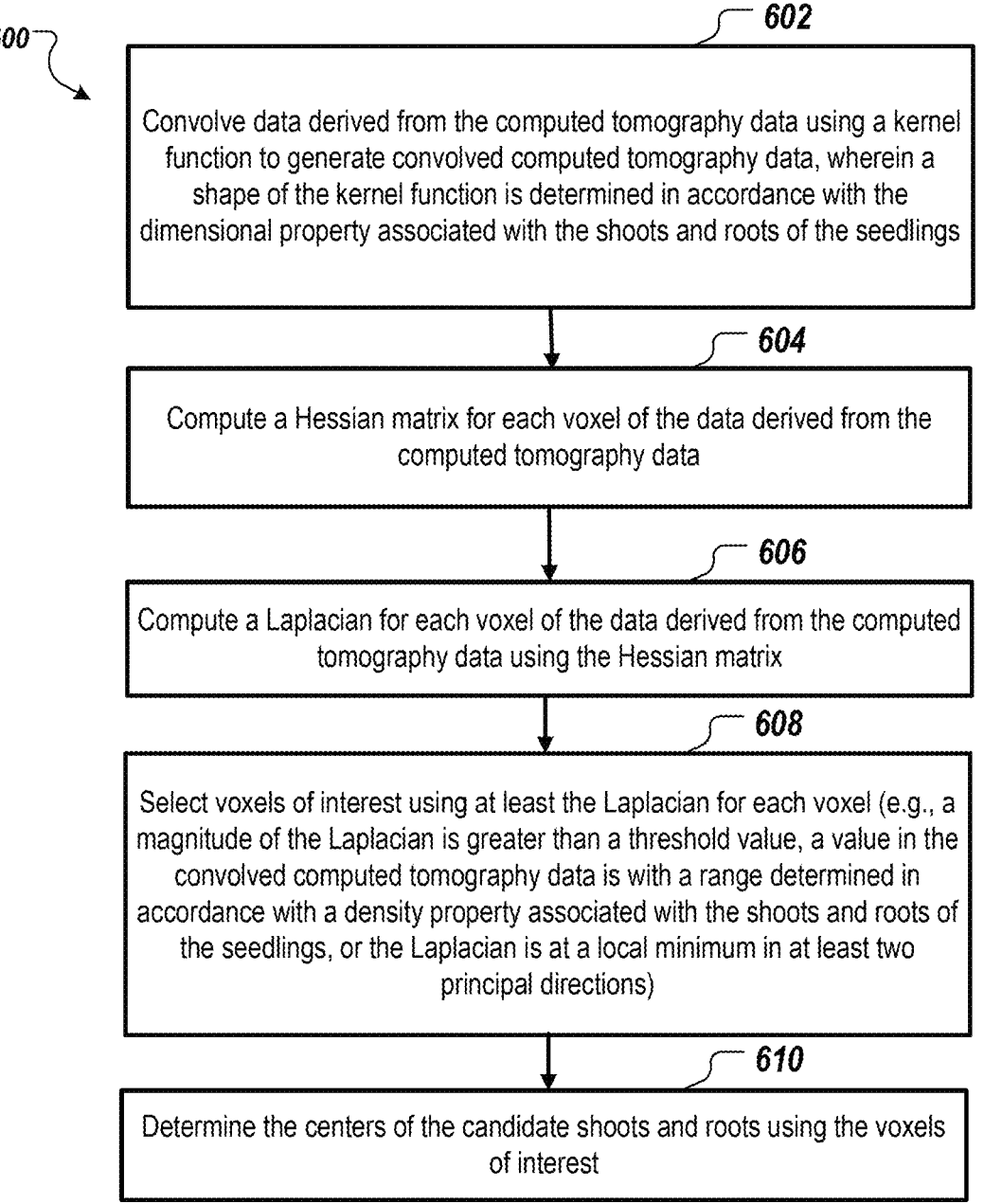

*600*

*602*

Convolve data derived from the computed tomography data using a kernel function to generate convolved computed tomography data, wherein a shape of the kernel function is determined in accordance with the dimensional property associated with the shoots and roots of the seedlings

*604*

Compute a Hessian matrix for each voxel of the data derived from the computed tomography data

*606*

Compute a Laplacian for each voxel of the data derived from the computed tomography data using the Hessian matrix

*608*

Select voxels of interest using at least the Laplacian for each voxel (e.g., a magnitude of the Laplacian is greater than a threshold value, a value in the convolved computed tomography data is with a range determined in accordance with a density property associated with the shoots and roots of the seedlings, or the Laplacian is at a local minimum in at least two principal directions)

*610*

Determine the centers of the candidate shoots and roots using the voxels of interest

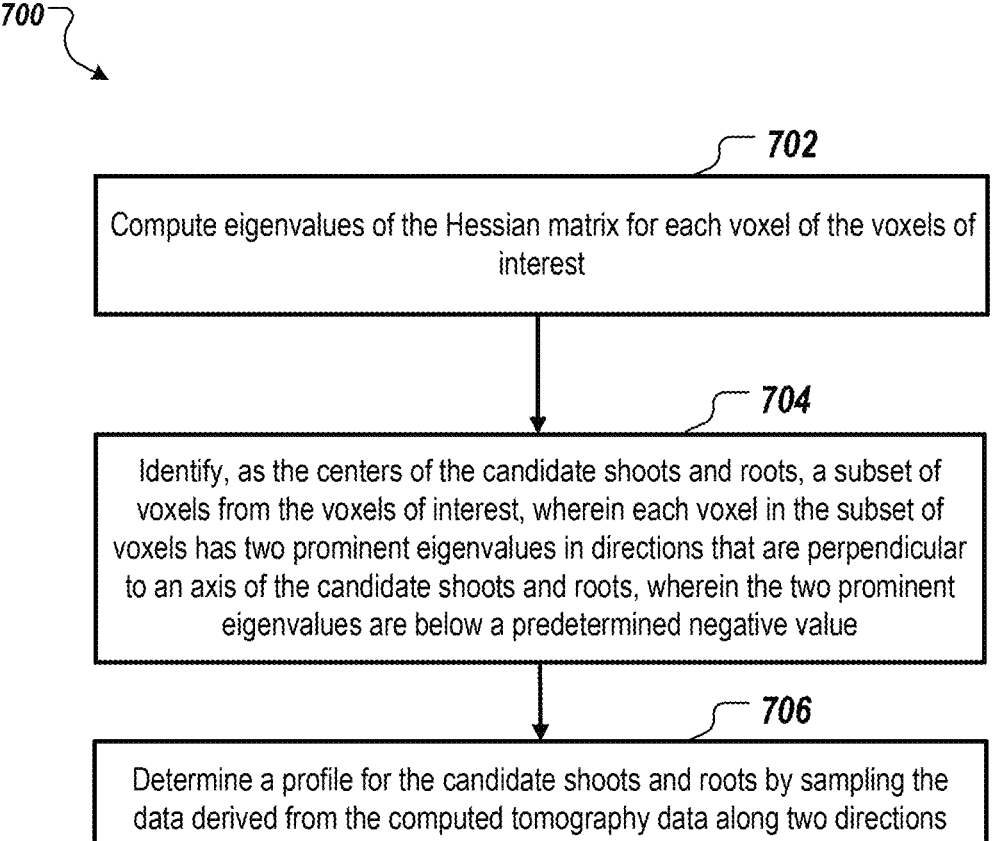

702

Compute eigenvalues of the Hessian matrix for each voxel of the voxels of interest

704

Identify, as the centers of the candidate shoots and roots, a subset of voxels from the voxels of interest, wherein each voxel in the subset of voxels has two prominent eigenvalues in directions that are perpendicular to an axis of the candidate shoots and roots, wherein the two prominent eigenvalues are below a predetermined negative value

706

Determine a profile for the candidate shoots and roots by sampling the data derived from the computed tomography data along two directions represented by the two prominent eigenvalues

FIG. 7

SEED QUALITY ANALYSIS USING COMPUTED TOMOGRAPHY

BACKGROUND

Germination tests can be used to assess seed quality. Populations of seeds are germinated under different conditions in damp paper towels on which arrays of seeds have been placed. The towels are rolled up and incubated in a germination chamber for a period of time. Afterwards, trained human analysts read the unrolled towels by recognizing the defects in seedlings. For example, the analysts can determine the number of normal seedlings, the number of abnormal seedlings, and the number of dead seedlings per germination towel. Seed quality test systems that rely on trained human analysts can have variability between different analysts. These systems can have low repeatability, and may not be easily scaled to analyze large quantities of seeds. In some cases, these systems may even include errors in the measured seed quality.

Three-dimensional (3D) X-ray computed tomography (CT) devices use X-rays to create images of the inside of an object without disassembling the object. 3D scan data from a CT scan combines a series of X-ray projections taken from different projection angles. Computer processing techniques can be used to create a 3D reconstruction of the scan object. 3D X-ray CT can be used for medical imaging or industrial inspection.

SUMMARY

This specification describes technologies relating to automatic seed quality analysis using CT. In particular, CT data representing a germination towel including seedlings can be processed by a singulator to generate a list of likely seedlings. Features associated with the likely seedlings can be processed by a classifier to generate a classification result that can indicate the quality of the seeds in the germination towel.

Particular embodiments of the subject matter described in this specification can be implemented to realize one or more of the following advantages. Compared to traditional systems that use trained human analysts, the systems and techniques described can generate consistent seed quality evaluation results that have reduced errors, and have high repeatability over time, across multiple tests, and across multiple geographic locations, such as across multiple testing facilities. Rather than only producing a classification result (e.g., counts of normal, abnormal, and dead seedlings per towel), the systems and techniques described can produce rich morphological and anatomical data (e.g., shoot or root length, diameter, mass, and volume) for each seedling and for each germination towel. Because the CT scanning process is non-destructive and is more efficient compared to human analysts, the systems and techniques can provide insights into seedling development by scanning the germination towels multiple times over the course of the germination process.

Rather than requiring specialized germination paper (e.g., accordion-like folded germination paper) to physically singulate seedlings, in some implementations, the systems and techniques can accurately singulate the seedlings using a specially designed singulator. The specially designed singulator can improve seedling singulation accuracy by performing segment extractions within discrete partitions of a total volume of the CT data of a germination towel. Therefore, the systems and techniques described are compatible with germination processes that use conventional germination towels, and are readily applicable to existing planting and germination workflow.

The systems and techniques can perform seed quality analysis on a wide variety of seeds, including small, medium, and large seed crops. Because the system does not rely on physical singulation, it is versatile across a range of seed sizes and planting patterns. Rather than using a black-box artificial intelligence algorithm that generates evaluation results that cannot be explained, the systems and techniques described can extract and process features that correspond to anatomical and morphological features in seedlings (e.g., shoot or root length, diameter, and curvature). Thus, the evaluation results of the systems and techniques described can be inspected and explained, can indicate predicative features, and can provide insights for analyzing and improving the germination process.

Rather than requiring training data that includes labels for each seedling in a towel, the systems and techniques can train a classifier using towel-level labels (e.g., counts of normal, abnormal, and dead seeds in a towel), which are readily available from the traditional systems that use human analysts. By training the classifier on training data having the towel-level labels, the system can reduce the time and effort needed to acquire labels for the training data, while maintaining at least similar accuracy as the accuracy of trained human analysts. The system can be trained using an additional step in an existing seed quality process, making it more feasible to collect a large amount of training data needed for the training of an accurate classifier than other methods.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 5A is a flowchart showing an example of a process to classify a germination towel.

FIG. 5B is a flowchart showing an example of a process to classify a germination towel.

FIG. 6 is a flowchart showing an example of a process to detect candidate shoots and roots in CT data.

FIG. 7 is a flowchart showing an example of a process to identify centers of candidate shoots and roots in CT data.

Like reference numbers and designations in the various drawings indicate like elements.

DETAILED DESCRIPTION

Figure 1A:
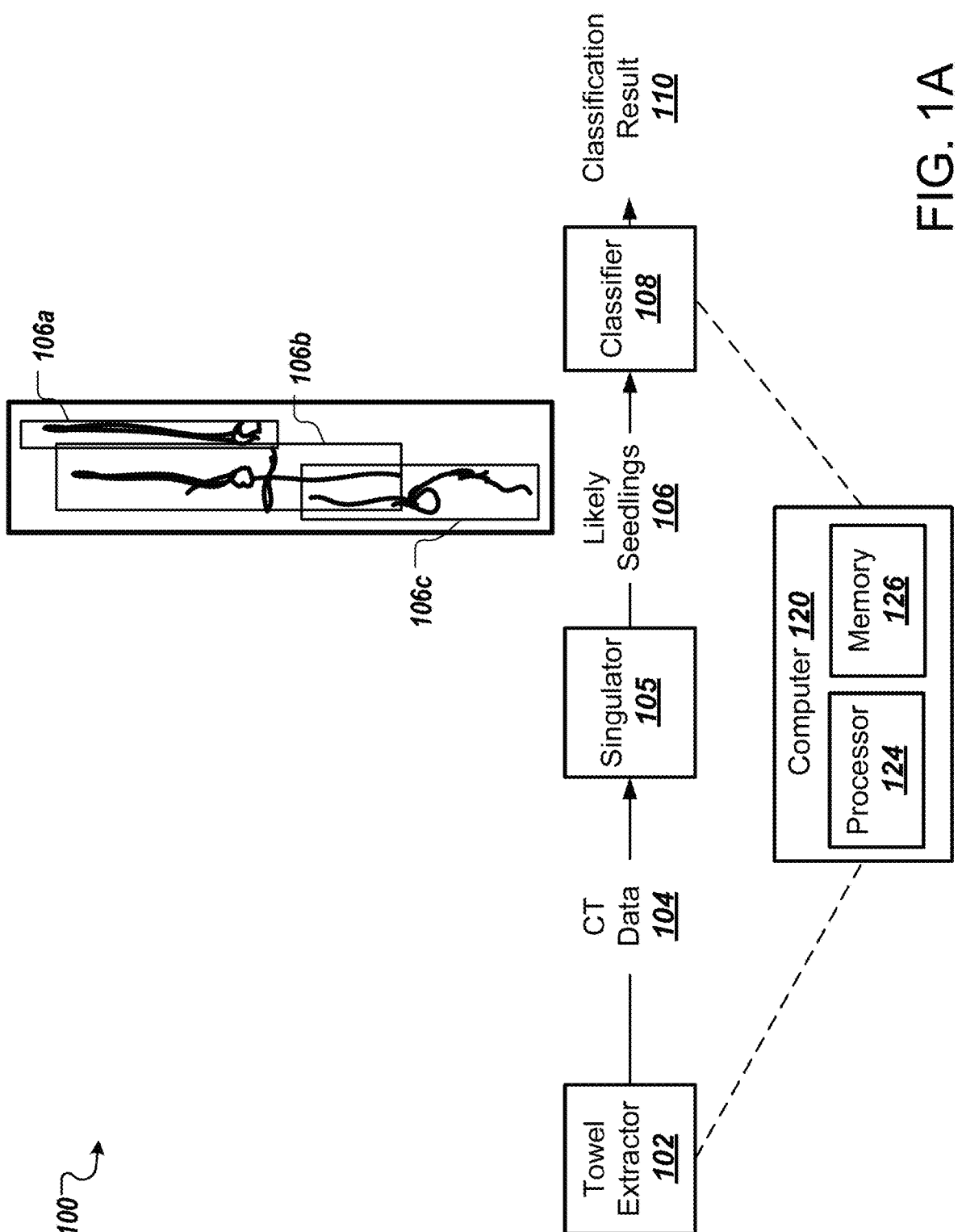
FIG. 1A shows an example system that performs seed quality analysis.
Figure 2B:
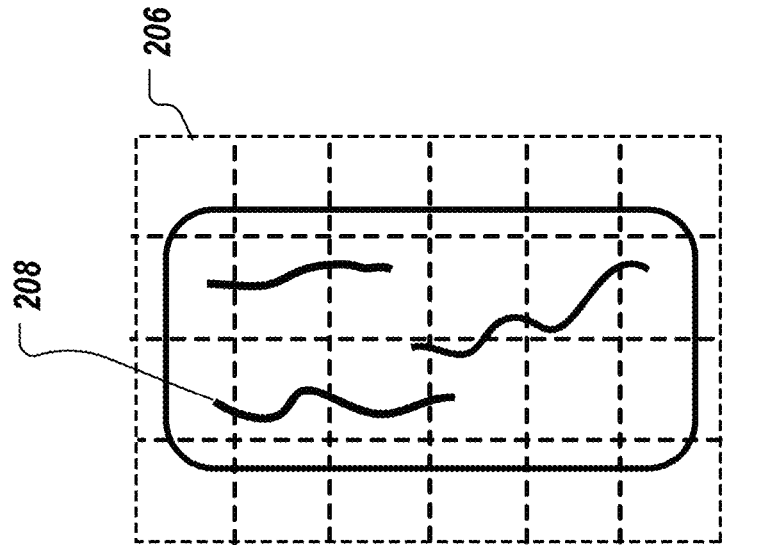
FIG. 2B shows an example of a two-dimensional illustration of discrete partitions of CT data.
Figure 2A:
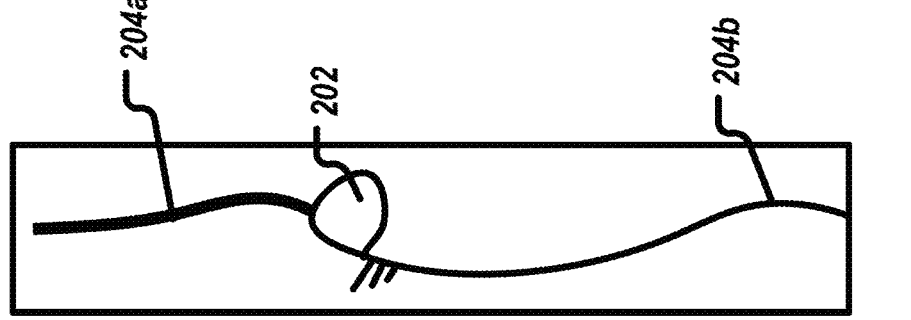
FIG. 2A shows an example of a seedling.

FIG. 1A shows an example system 100 that performs seed quality analysis. The system 100 performs seedling singulation and classification for seed quality analysis using a singulator 105 and a classifier 108. During a germination test, arrays of seeds are placed on damp germination towels, e.g., following a planting pattern. The towels are rolled up and incubated in a germination chamber for a period of time, such as seven or ten days. After the period of time, the seeds in the germination towel grow into seedlings. Normally, a seedling has a seed, a shoot and a root. FIG. 2A shows an example of a seedling. The seedling has a seed part 202, a shoot part 204*a*, and a root part 204*b*. The seed part 202 is larger in diameter relative to each of the shoot part 204*a* and the root part 204*b*. In some cases, a seedling may be dead or may grow abnormally. A dead or abnormal seedling may not include the shoot or the root, or may include an abnormal shoot or an abnormal root that is different from the shoots and roots of normal seedlings.

Figure 1C:
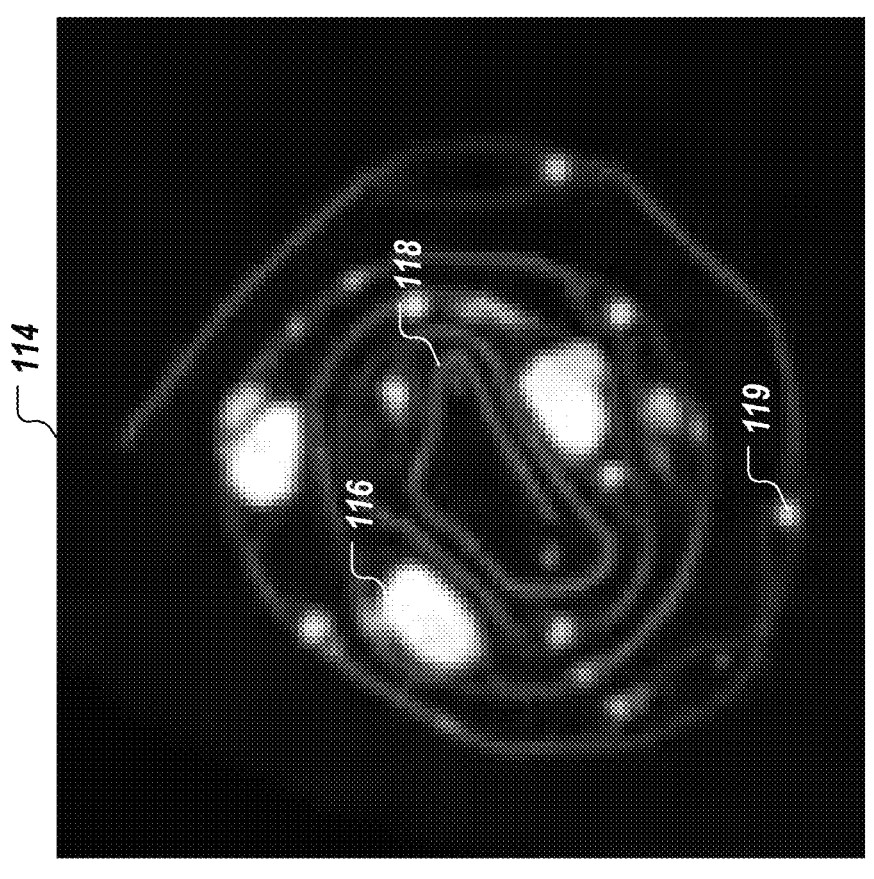
FIG. 1C shows an example of a cross-sectional image of a germination towel.

The system 100 obtains computed tomography (CT) data 104 representing a rolled-up germination towel that includes seedlings. The CT data 104 can be a 3D reconstruction volume of the germination towel generated from a CT scan of the germination towel. FIG. 1C shows an example of a cross-sectional image 114 of a germination towel. For example, the image 114 shows a two-dimensional (2D) slice of the 3D CT data 104. The image 114 is a cross-sectional image of the germination towel. The image 114 shows a rolled-up paper towel 118, seeds 116, and shoots and roots 119 of the seedlings. The seeds 116 have a relatively larger size (e.g., in diameter) than each of the shoots and roots 119.

In some implementations, a CT scanner, e.g., an X-ray CT scanner, can perform a CT scan of germination towels. For example, a CT scanner can scan batches of multiple germination towels, one batch at a time. In some implementations, towels can be grouped into fixtures that each have a unique identifier, e.g., a radio frequency identification (RFID) tag, a quick response (QR) code, or other machine readable universally unique identifier (UUID). Each fixture can have one or more individually-addressed receptacles for the germination towels. Each towel can correspond to a serial number. Each towel can be associated with a specific receptacle in a specific fixture. The scan data for each towel can be automatically associated with each individual towel.

In some implementations, the fixtures of the towels can be loaded onto a conveyor belt in groups. The fixtures of the towels can be sequentially scanned by the CT scanner. For each scan, one fixture can be scanned by the CT scanner. A fixture identification (ID) for the fixture can be obtained or identified by the CT scanner. Towel serial numbers associated with each receptacle in the fixture can be obtained. The group of towels in the fixture can be scanned by the CT scanner. In some implementations, the group of towels can be automatically ejected from the CT scanner to an outfeed.

Figure 1B:
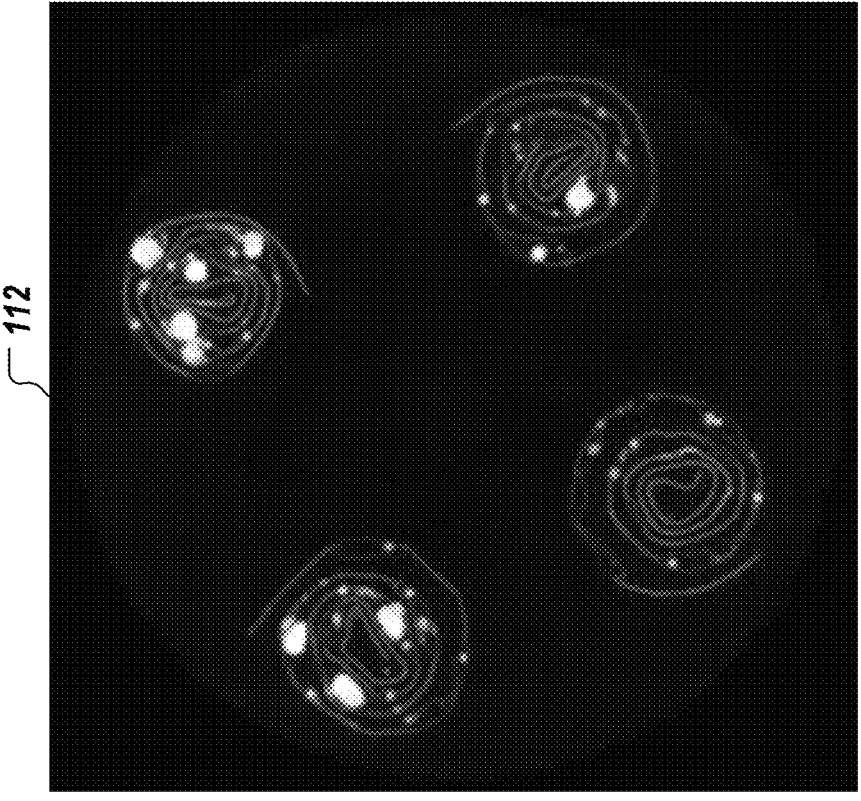
FIG. 1B shows an example of a cross-sectional image of a batch of germination towels.

In some implementations, the CT scanner, or another system, can generate CT scan data (e.g., a 3D reconstruction volume) of multiple germination towels. FIG. 1B shows an example of a cross-sectional image 112 of a batch of germination towels. For example, the image 112 is a 2D slice of a 3D reconstruction volume of a batch of four germination towels. The image 112 is a cross-sectional image of four germination towels.

In some implementations, individual towels can be isolated in each CT scan data for downstream processing. In some implementations, the system 100 can include a towel extractor 102. The towel extractor 102 can perform towel separation of a CT scan of multiple germination towels. CT scan data can include multiple towels in known (or identifiable) locations in the receptacles in a fixture. In some implementations, the system 100, e.g., the towel extractor

102, can obtain locating features from the fixture, the features corresponding to each individual towel receptacle, or both, to identify where in the CT scan data each towel is located. In some implementations, the profiles of the towel receptacles can be circles, rectangles, hexagons, or any suitable shape. The system 100 can locate the profiles using a shape identification technique. For example, the system 100 can locate circular profiles using a circle identification technique, such as using a Hough transform. The system 100 can use the one or more of the circular profiles, e.g., combined with a locating clocking feature, such as a notch or alphanumerical label embossed into the towel receptacle, to create volume masks for the towels depicted in the CT scan data. The system 100 can use the volume masks to isolate each individual towel in the CT scan data from the receptacle that supports the towel during scanning.

For example, the CT scan data that includes the image 112 depicts four germination towels. The towel extractor 102 can process the CT scan data to generate CT data 104 for each of the four germination towels. For example, the image 114 in FIG. 1C can be CT data 104 for one of the germination towels shown in FIG. 1B. In some implementations, the system 100 can use other suitable methods to isolate the individual towels in a CT scan.

The system 100 determines likely seedlings 106 in the CT data 104 by processing the CT data 104 using the singulator 105. The singulator 105 can be configured to singulate each seedling depicted in the CT data 104. For example, the input to the singulator 105 can be the CT data 104 that depicts each individual towel. The output of the singulator 105 can be data (e.g., segmentation masks or bounding boxes) for individual likely seedlings, such as bounding boxes 106*a*, 106*b*, and 106*c*. More details of the singulator are described in connection with FIG. 3, FIG. 6, and FIG. 7.

The system 100 classifies the germination towel using the classifier 108 trained to use at least the likely seedlings 106, as input. In some implementations, the classifier 108 can generate a predicted category for each likely seedling 106 using the classifier. In some implementations, the classification result 110 can include a count of the seedlings in the germination towel that are predicted to belong to each category of a plurality of germination categories. The plurality of germination categories can include normal, abnormal, and dead. Other types of germination categories are possible. For example, the classification result 110 can include towel-level predictions for the count of normal seedlings, the count of abnormal seedlings, and the count of dead seedlings in a germination towel. For example, a germinal towel can include 50 seedlings. The system 100 can generate a classification result 110 indicating that there are 40 normal seedlings, 5 abnormal seedlings, and 5 dead seedlings.

In some implementations, the classifier 108 can perform classification for multiple likely seedlings. In some implementations, the classifier 108 can perform the classification for multiple likely seedlings without classifying each individual likely seedling. For example, the system 100 can use the classifier 108 to generate class scores, e.g., class probabilities, for the likely seedlings. Instead of classifying each likely seedling, e.g., by taking the argmax of the class scores for the likely seedling, the system 100 can generate aggregated scores for all the likely seedlings in the germination towel. For example, the system 100 can generate a sum, (or a product) of the class scores for the 50 likely seedlings in the germination towel. The system 100 can classify the germination towel based on the aggregated scores. For example, the aggregated scores for normal, abnormal, and dead categories can be 40.2, 7.1, and 2.7, respectively. The system can generate a classification result indicating that there are likely 40 normal seedlings, 7 abnormal seedlings, and 3 dead seedlings in the germination towel.

In some implementations, the system 100 can calculate a germination rate for the germination towel using the count of the predicted normal seedlings. For example, the system 100 can determine that there are 40 normal seedlings out of 50 seedlings in the germination towel. The system can calculate the germination rate for the germination towel: $^{40}/_{50}=80\%$.

The system 100 provides the classification result 110 generated from the classifier 108. In some implementations, the system 100 can provide the classification result 110 to a downstream system. In some implementations, the system 100 can provide the classification result 110 to an evaluation system that determines seed quality, can identify a cause for the seed quality, and/or can identify solutions for improving seed quality. In some implementations, the system 100 can provide the classification result 110 to a human evaluator who reviews the classification result 110.

The system 100 includes a computer 120. In some implementations, the computer 120 can be one or more computers that are integrated with a CT scanner that generates the CT scan, the CT data 104, or both. In some implementations, the computer 120 can be located remotely from the CT scanner (e.g., at a remote server and communicatively coupled with the CT scanner, e.g., over the Internet). The computer 120 can include a processor 124 (i.e., one or more processing devices). The processor 124 can be embodied by any suitable computational or data processing device(s), such as a central processing unit (CPU), a graphics processing unit (GPU), an application specific integrated circuit (ASIC), and/or a comparable device. The processor 124 can be implemented as a single controller or a plurality of controllers or processors.

The computer 120 can include a memory 126 (i.e., one or more memory devices). The memory 126 can be fixed or removable. The memory 126 can encode computer program instructions or computer code contained therein. Memory 126 can be any suitable storage device, such as a non-transitory computer-readable medium. The term "non-transitory," as used herein, can correspond to a limitation of the medium itself (i.e., tangible, not a signal) as opposed to a limitation on data storage persistency (e.g., random access memory (RAM) vs. read-only memory (ROM)). A hard disk drive (HDD), random access memory (RAM), flash memory, or other suitable memory can be used. The one or more memories can be combined on a same integrated circuit as one or more processors, or can be separate from the one or more processors. Furthermore, the computer program instructions stored in the memory, and which can be run by the processor(s), can be any suitable form of computer program code, for example, a compiled or interpreted computer program written in any suitable programming language. In some implementations, the computer 120 can store a computer data structure representing the CT data 104, the likely seedlings 106, the classification result 110, or a combination of these, in the memory 126. In some implementations, the CT data 104 can be represented as a 3D volume, in chunks or slabs of a 3D volume, or as a series of images representing slices of the CT data 104. In some implementations, the likely seedlings can be represented as a 3D mask, a 3D profile and diameters along the profile, a 3D bounding box, or a combination of any of these representations. In some implementations, the classification result can be represented as one or more scores, e.g., one or more percentages, or a distribution.

The processor 124 and the memory 126 can be configured to perform one or more processes including one or more processes that implements the towel extractor 102, the singulator 105, the classifier 108, or a combination of these. The memory and the computer program instructions can be configured, with the processor for the particular device, to cause a hardware apparatus to perform one or more of the processes described in this application. Therefore, in some implementations, a non-transitory computer-readable medium is encoded with computer instructions that, when executed in hardware, perform a process such as one of the processes described herein. In some cases, one or more of the processes described herein are implemented entirely in hardware.

As noted above, in some implementations, these processes can be performed by the computer 120 that is separate from the CT scanner. In some implementations, these processes can be performed by a CT scanner, and so no separate computer is needed. In such implementations, the computer 120 and the CT scanner can be integrated into a single device, rather than being in separate devices. In some implementations, the CT scanner can be an inexpensive scanning device with minimal processing capabilities, and a separate computer 120 is communicatively coupled with the CT scanner and is configured to perform one or more of the processes described herein.

Figure 3:
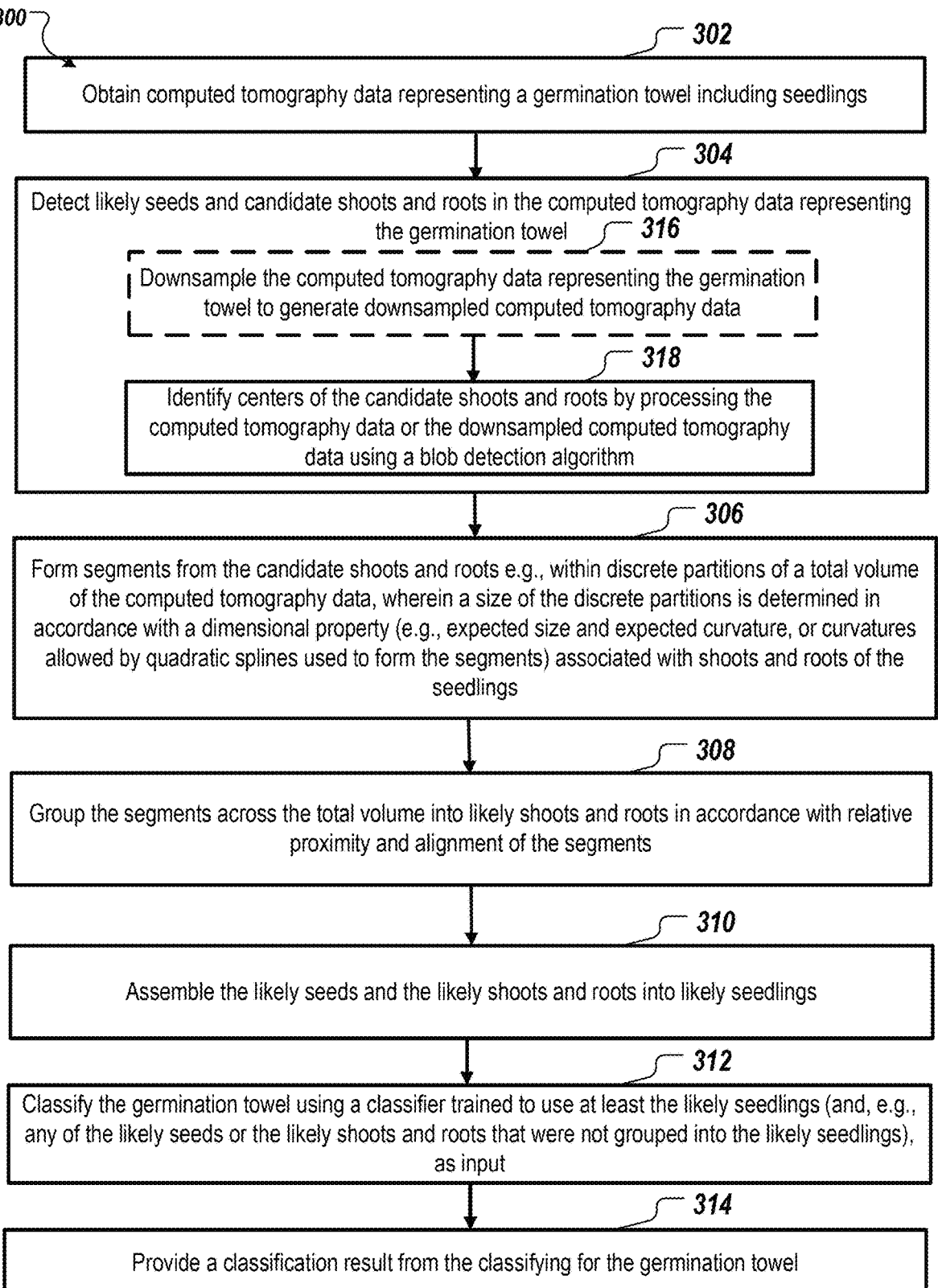
FIG. 3 is a flowchart showing an example of a process to perform seed quality analysis.

FIG. 3 is a flowchart showing an example of a process 300 to perform seed quality analysis. For example, the system 100 in FIG. 1A can perform the process 300. The system obtains (302) CT data representing a germination towel including seedlings.

The system detects (304) likely seeds and candidate shoots and roots in the CT data representing the germination towel. In some implementations, the system can detect the likely seeds using one or more morphological operations. In some implementations, the system can detect the likely seeds using smoothing, erosion, dilation, connected components, or a combination of these operations. In some implementations, the system can generate a list of the likely seeds, (e.g., masks or bounding boxes for the likely seeds). In some implementations, the system can assemble the likely seeds and the likely shoots and roots into likely seedlings, as discussed later in operation 310.

In some implementations, detecting the candidate shoots and roots can include identifying centers of the candidate shoots and roots. In some implementations, the system can identify (318) centers of the candidate shoots and roots by processing the CT data using a blob detection algorithm. The shoots and roots can have worm or string-like features in the 3D CT data, e.g., the CT data 104. In a 2D slice of the 3D CT data, the shoots and roots can have a blob like shape. For example, in the 2D image 114, a shoot or a root 119 has a blob like shape. Thus, the system can identify center positions of the shoots or roots parts of the seedlings using a blob detection algorithm.

In some implementations, the system can downsample (316) the CT data representing the germination towel to generate downsampled CT data. In some implementations, the system can process the downsampled CT data using the blob detection algorithm to identify (318) the centers of the candidate shoots and roots. For example, the system can perform blob detection on a downsampled (e.g., decimated) volume to speed up the computation, to reduce noise in the CT data, to reduce memory requirements, or a combination of these.

FIG. 6 is a flowchart showing an example of a process 600 to detect (304) candidate shoots and roots in CT data. The system can convolve (602) data derived from the CT data using a kernel function to generate convolved CT data. For example, the data derived from the CT data can be the downsampled CT data generated by the operation 316 of FIG. 3, or the original CT data. The result of the convolving, e.g., the convolved CT data, can include the location and direction of each object of interest for the candidate shoots and roots. For example, by convolving (data derived from) the CT data using a kernel function, the system can generate candidate activation sites for a shoot or a root. For example, a candidate activation site can be a start of a shoot or a root. In some implementations, each candidate activation site can be a vector. The vector can include a 3D location indicating a center of a candidate shoot or root, and a direction of a candidate shoot or root.

In some implementations, a shape of the kernel function can be determined in accordance with the dimensional property associated with the shoots and roots of the seedlings. For example, the system can convolve the CT data (or the downsampled CT data) with a series of kernels. The system can select the kernels using the dimension and/or shape of the shoots and roots of the seedlings, e.g., based on a type of the seedlings. In some implementations, the system can use a Gaussian convolution kernel. For example, if the diameter of the shoots is about 2 mm, the system 100 can use a Gaussian kernel with a full width at half value of 2 mm.

In some implementations, the system can use a kernel that represents a point-spread function of the CT imagery. For example, the kernel can be a rectangular kernel having a predetermined width convolved with a blurring filter. In some implementations, the predetermined width of the rectangular kernel can be the likely diameter of the shoots or roots. In some implementations, a positive part of the kernel can match the likely diameter of the shoots or roots. For example, if the likely diameter of the shoots or roots has an estimated width of 3 voxels, the kernel can be [0, 0.5, 1, 1, 0.5, 0].

In some implementations, the predetermined width of the series of (e.g., rectangular) kernels can be 0.9 mm, 1.4 mm, 1.9 mm, 2.4 mm, and 2.9 mm. In some implementations, the predetermined width of the series of (e.g., rectangular) kernels can be 0.7 mm and 1.0 mm, to account for negative blobs (e.g., a dark region surrounded by a bright background, instead of a bright region surrounded by a dark background) detected by the blob detection algorithm that represent the core of hollow shoots or roots.

In some implementations, the system can use a kernel that represents partial volume effect due to voxelization. The partial volume effect happens when an object partially covers a voxel, resulting in a CT value being a combination, e.g., a weighted average, of the object and the background. In some implementations, the system can use a kernel that uses a blurring filter that models the partial volume effect.

The system can compute (604) a Hessian matrix for each voxel of the data derived from the CT data. In some implementations, each voxel can be a cube, e.g., having the same size in each of the X, Y, and Z dimensions. In some implementations, each voxel may not be a cube. For example, each voxel can be a cuboid. A Hessian matrix is a square matrix of second-order partial derivatives of a scalar-valued function. For example, the system can compute the second-order partial derivatives for each voxel in the (e.g., downsampled) CT data. In some implementations, the system can compute the Hessian matrix using one or more convolution kernels. The elements of the Hessian matrix can include nine second derivatives. The nine values of the nine second-order partial derivatives form a 3×3 Hessian matrix for each voxel in the (e.g., downsampled) CT data. For example, the system can compute the second derivatives on data volumes generated from convolving the data derived from the CT data using the kernel described above. The second derivatives can capture the topology of the CT data and can help the system find and characterize maxima, saddle points, or both.

The system can compute (606) a Laplacian for each voxel of the data derived from the CT data using the Hessian matrix. The Laplacian is the trace of the Hessian matrix, e.g., the sum of the diagonal elements of the Hessian matrix. In some implementations, for each voxel, the system can choose a target width for the voxel. The target width for the voxel can be the largest Laplacian. Thus, the system can choose a candidate thickness at each voxel.

The system can select (608) voxels of interest using at least the Laplacian for each voxel. In some implementations, the system can select the voxels of interest such that one or more criteria are satisfied. In some implementations, the system can select the voxels of interest such that a magnitude of the Laplacian for each voxel of the voxels of interest is greater than a threshold value. In some implementations, the system can determine the threshold value based on an expected contrast between the object of interest (e.g., the shoots or the roots) and the background (e.g., the air). For example, the expected contrast can be associated with a difference in attenuation values between the object of interest and the background. In some implementations, the threshold value can be a predetermined percentage of the expected contrast. For example, the system can select a voxel which has a magnitude of the Laplacian that is greater than the threshold value. In some implementations, the Laplacian can be a negative value, e.g., for positive blobs. Thus, the system can select the voxels of interest such that the Laplacian for each voxel is less than a negative threshold value.

In some implementations, the system can select the voxels of interest such that a value for each voxel of the voxels of interest in the convolved CT data is within a range determined in accordance with a density property associated with the shoots and roots of the seedlings. For example, the system can select the voxels of interest such that the value of the convolved pixel (e.g., convolved with a Gaussian or rectangular convolution kernel) is within a predefined range. The predefined range can be determined using the typical density of the plant materials. For example, the predefined range can be within 0.6 and 1.3 times the attenuation value for water.

In some implementations, the system can select the voxels of interest such that (i) a magnitude of the Laplacian for each voxel of the voxels of interest is greater than a threshold value, and/or (ii) a value for each voxel of the voxels of interest in the convolved CT data is with a range determined in accordance with a density property associated with the shoots and roots of the seedlings.

In some implementations, the system can select the voxels of interest such that the Laplacian for each voxel of the voxels of interest is at a local minimum in at least two principal directions. For example, the system can select the voxels of interest such that the Laplacian for each voxel is at a local minimum in at least two of the principal directions among x, y, and z.

The system can determine (610) the centers of the candidate shoots and roots using the voxels of interest. FIG. 7 is a flowchart showing an example of a process 700 to identify centers of candidate shoots and roots in (e.g., downsampled) CT data. The system can compute (702) eigenvalues of the Hessian matrix for each voxel of the voxels of interest. For example, for each voxel of the voxels of interest, the system can form the Hessian matrix. The system can compute the eigenvectors and eigenvalues for each voxel.

The system can identify (704), as the centers of the candidate shoots and roots, a subset of voxels from the voxels of interest. In some implementations, the system can identify the subset of voxels that satisfy one or more criteria. In some implementations, the system can identify the subset of voxels such that each voxel in the subset of voxels can have two prominent eigenvalues in directions that are perpendicular to an axis of the candidate shoots and roots, and the two prominent eigenvalues can be below a predetermined negative value. For example, the system can identify blobs (e.g., the subset of voxels) that have two prominent eigenvalues (e.g., in the directions that are perpendicular to the axis of the shoot).

For example, in 3D, there are three eigenvalues for the local Hessian matrix for each voxel. There can be different combinations of prominent eigenvalues. Here, a prominent eigenvalue is an eigenvalue that satisfies a threshold. If all three eigenvalues are prominent (e.g., large negative values), the system can determine that there is a sphere-like blob at the voxel. If only one eigenvalue is prominent, the system can determine that there is a sheet-like object at the voxel. If two eigenvalues are prominent and the third one non-prominent (e.g., a small value), the system can determine that there is a worm-shaped blob, which is the shape of shoots or roots. Thus, the system can identify, as the centers of the candidate shoots and roots, a subset of voxels that have two prominent eigenvalues.

In some implementations, the prominent eigenvalues can be negative values. The system can reduce false positives by identifying the centers of the candidate shoots and roots using one or more additional criteria. In some implementations, the one or more additional criteria can include the sum of the two smallest prominent eigenvalues plus the absolute value of the third eigenvalue being less than the negative threshold value used on the Laplacian as described in the operation 608. In some implementations, the one or more additional criteria can include the ratio of the smallest to the second-smallest eigenvalue being above a threshold, e.g., 0.25, 0.35, or 0.5. In some implementations, the one or more additional criteria can include the ratio of the greatest eigenvalue to the sum of the two smallest eigenvalues being less than a threshold, e.g., 0.15, 0.2, or 0.25.

The system can determine (706) a profile for the candidate shoots and roots by sampling the data derived from the CT data along two directions represented by the two prominent eigenvalues. For example, the eigenvectors can represent the principal direction for the blob. The system can create a profile of the shoots or roots from the (e.g., downsampled) CT data along the two directions represented by the two most prominent eigenvalues. In some implementations, the system can compute the centers of candidate shoots and roots to sub-voxel accuracy using a quadratic model. For example, to determine a minimum or maximum with sub-voxel accuracy, the system can generate a fitted curve by fitting a quadratic (e.g., parabola) or higher-order polynomial to the neighborhood around the extremum (e.g., a one-dimensional (1D) or 2D window). The system can compute an analytic location of the peak or trough from the fitted curve. In 1D, by fitting three points to a parabola, the system can analytically solve for the extremum's location with sub-unit precision. In 2D, the system can fit a surface (e.g., a 2D quadratic) and can solve for its stationary point. In some implementations, the system can create two sampled profiles for the candidate shoots and roots such that an edge is indeed present on both sides, e.g., left and right sides.

Referring to FIG. 3, the system forms (306) segments from the candidate shoots and roots (e.g., the centers of the candidate shoots and roots). In some implementations, the system can form the segments from the candidate shoots and roots within the entire 3D volume of the CT data representing a single germination towel. In some implementations, the system can form the segments from the candidate shoots and roots within one or more parts of the CT data, e.g., a segmentation mask for a feature in the CT data, or a bounding box for a feature in the CT data.

In some implementations, the system can form (306) segments from the candidate shoots and roots within discrete partitions of at least a portion of the CT data, e.g., discrete partitions of a total volume of the CT data. In some implementations, the system can perform the operation 306 for different discrete partitions simultaneously, e.g., in parallel. For example, limiting the connections being formed for the segments from the candidate shoots and roots to these discrete partitions, i.e., defined sub-volumes, creates a clustering problem that can be solved in parallel. By using the partitions, the system can reduce the processing time needed to generate segments from the candidate shoots and roots because each partition has fewer candidate shoots and roots. By using the partitions, the system can improve the quality of the segments because the system generates less false positive segments in the partitions.

In some implementations, the system can partition the CT data (e.g., a 3D volume) into sub-volumes in a gridded fashion. For example, each partition can be a cube or a cuboid, e.g., a 5 mm$^3$ cube, or an 8 mm$^3$ cube. FIG. 2B shows an example of a 2D illustration of discrete partitions 206 of CT data. Each partition includes a segment of a shoot or a root. In some cases, a partition can include multiple segments of one or more shoots or roots. For example, the shoot (or root) 208 is in four partitions.

In some implementations, the size of the discrete partitions can be determined in accordance with a dimensional property associated with shoots and roots of the seedlings. In some implementations, the dimensional property can include an expected size, an expected curvature, or both, associated with the shoots and roots of the seedlings. In some implementations, the system can choose the size of the discrete partitions based on the expected size (e.g., thickness) of the shoots and roots of the seeds. For example, if the expected thickness of the shoots and roots are 2 mm, the system can divide the CT data into discrete partitions with 5 mm or 1 cm size, for one or more of the x, y, and z dimensions.

In some implementations, the size of the discrete partitions can be determined in accordance with an expected size and an expected curvature of the shoots and roots of the seedlings. In some implementations, the system can choose the size of the discrete partitions based on an expected radius of the curvature of the shoots and roots. For example, the size of the discrete partitions can be a size that is smaller than twice the radius of the curvature of the shoots and roots. In some implementations, the size of the discrete partitions can be determined in accordance with a range of curvatures allowed by one or more quadratic splines that are used to form the segments within the discrete partitions. For example, the maximum allowed curvature can be that the two end points not being more than 45 degrees in angle vis a vis another.

In some implementations, the system can represent the segments, e.g., within a partition, parametrically by a polynomial, e.g., a quadratic function. In some implementations, the system can determine the direction of a segment using the polynomial representation of the segment. In some implementations, the system can represent a segment using $\{z=f(x), y=g(x)\}$, or $\{x=f(z), y=g(z)\}$. For example, the segments can be represented by $z=a+b*x+c*x^2$; $y=d+e*x+f*x^2$. In some implementations, the system can represent a segment using a parametric equation, such as $\{x=f(t); y=g(t); z=h(t)\}$. In some implementations, the system can select the dependent variables based on the orientation of the eigenvectors.

In some implementations, the system can further divide a partition into sub-partitions for shoots and roots with a curvature that is larger than a threshold. In some implementations, the system can divide an initial segment into sub-segments for shoots and roots with a curvature that is larger than a threshold. For example, in areas with great curvature, the system can form the segments from the candidate shoots and roots in more granular partitions or sub-segments as needed.

In some implementations, the system can obtain data related to the segments. For example, the system can characterize each segment by sampling the CT data (e.g., the full 3D volume) in various radial profiles across and along the shoot or root. In some implementations, the system can generate an estimation of density or thickness of the shoot or root. In some implementations, the system can reduce false positive segments when obtaining data related to the segments. For example, if the density or thickness for a segment is less than a threshold, the system can determine that the segment is a false positive. In some implementations, the system can determine whether a segment is hollow.

The system groups (308) the segments across the total volume into likely shoots and roots in accordance with relative proximity and alignment of the segments. In some implementations, the system can determine the relative proximity of the segments using centers of the candidate shoots and roots for the segments, e.g., centers having sub-voxel accuracy. In some implementations, the system can determine the relative alignment of the segments using direction vectors for the candidate shoots and roots for the segments. For example, the system can determine the relative alignment of the segments using direction vectors for end points of the segments. If the relative proximity and/or alignment of two segments satisfies a criterion, the system can group the two segments into a likely shoot and root. In some implementations, the system can determine a list of likely shoots and a list of likely roots. In some, the system can determine a single list of likely shoots and roots.

A likely shoot and root can either be a likely shoot or a likely root for a seedling. In some implementations, at this stage, the system does not differentiate whether it is a likely shoot or a likely root. In some implementations, the system can determine whether a likely shoot and root is a likely shoot or a likely root before or when the system assembles the likely seeds and the likely shoots and roots at operation 310, such as using known growth direction of the shoots and the roots.

Each of the segments established in the operation 306 can extend within the discrete partitions. Typically, a shoot or a root for a seedling includes a plurality of such segments. The system can merge segments into likely shoots and roots. In some implementations, the system can use a greedy algorithm. For example, the system can start with merging two segments that fit together best according to a criterion, and can proceed in the order of best fitting to less fitting according to the criterion. In some implementations, the system can use a globally optimal algorithm. For example, the system can use (e.g., adapted versions of) Hungarian algorithm for bipartite graphs, Edmonds' Blossom algorithm, or both.

In some implementations, the system can define how well the ends of two segments match one another using one or more criteria. For example, the one or more criteria can be used to determine how well the curve parametrizations of two segments match one another. The curve parametrizations can include the curve trajectory, the thickness, or both. In some implementations, in response to identifying a possible match of two segments based on a criterion, the system can determine if the volume connecting the two segments was commensurate with containing a shoot or root of the expected thickness. For example, the system can determine whether two segments already found to be aligned geometrically are part of the same shoot or the same root. The system can determine that there is a gap between the endpoints of the two segments. The system can sample the CT data to determine whether there is some matter for shoots or roots at the gap. If there is some matter for shoots or roots, the system can determine to merge or combine the two segments. If there is no matter for shoots or roots, e.g., the gap is just air, the system can determine not to merge or combine the two segments because the two segments are not likely to belong to the same shoot or root.

The system assembles (310) the likely seeds and the likely shoots and roots into likely seedlings. In some implementations, the system can try to associate each likely shoot (or each likely root) with a likely seed. In some implementations, the system can represent a likely seedling as an assembly of one likely seed, and optionally, one likely shoot, and optionally, one likely root. Some seeds may not have sprouted, and so will be considered dead or abnormal. Therefore, a likely seedling need not include a likely shoot and/or a likely root.

Generally, roots are thinner than shoots. In some implementations, the system can determine whether a likely shoot and root is a likely shoot, or a likely root based on a thickness threshold, e.g., 2 mm, 2.2 mm, or 1.8 mm. For example, if the average thickness of a likely shoot and root is 3 mm, the system can determine that the likely shoot and root is a likely shoot. For example, if the average thickness of a likely shoot and root is 1.5 mm, the system can determine that the likely shoot and root is a likely root.

In some implementations, the growth direction of shoots and roots is known. For example, the growth direction of shoots is upwards, and the growth direction of shoots is downwards in the germination towel. In some implementations, the system can determine whether a likely shoot and root is a likely shoot, or a likely root based on the growth direction of a likely shoot and root.

In some implementations, the system can match a likely seed with a likely shoot and root using one or more matching criteria. For example, one matching criterion can be the distance between an end of a likely shoot (or a likely root) and a center of a likely seed. If the distance is less than a threshold, the system can determine that the likely shoot (or root) and the likely seed belong to the same likely seedling. In some implementations, the system can assemble the likely seeds and the likely shoots and roots into likely seedlings using Hungarian algorithm for a bipartite graph problem.

In some implementations, the system can generate features associated with the likely seedlings. In some implementations, after the likely shoots and roots and the likely seeds have been assembled into likely seedlings, the system can extract features for each likely seedling. For example, the system can determine mass, volume, length, and thickness for the various parts (e.g., a root part, a shoot part, or a seed part) of a likely seedling. The system can use these features in the classification operation (312) described herein. In some implementations, the system can determine the mass for a part of a likely seedling using a linear attenuation coefficient (LAC) for a material (e.g., X-ray attenuation) of the part and the volume for the part. In some implementations, the CT data can be obtained using a CT scan at one or more kV values. The system can obtain LACs for the material at the one or more kV values.

The system classifies (312) the germination towel using a classifier trained to use at least the likely seedlings, as input. The classifier can generate a predicted germination category for each likely seedling. For example, the predicted germination category can be normal, abnormal, or dead. Other germination categories are also possible. In some implementations, the classifier can generate scores, e.g., probabilities, indicating a likelihood that a likely seedling belongs to each germination category of the plurality of categories.

Figure 4:
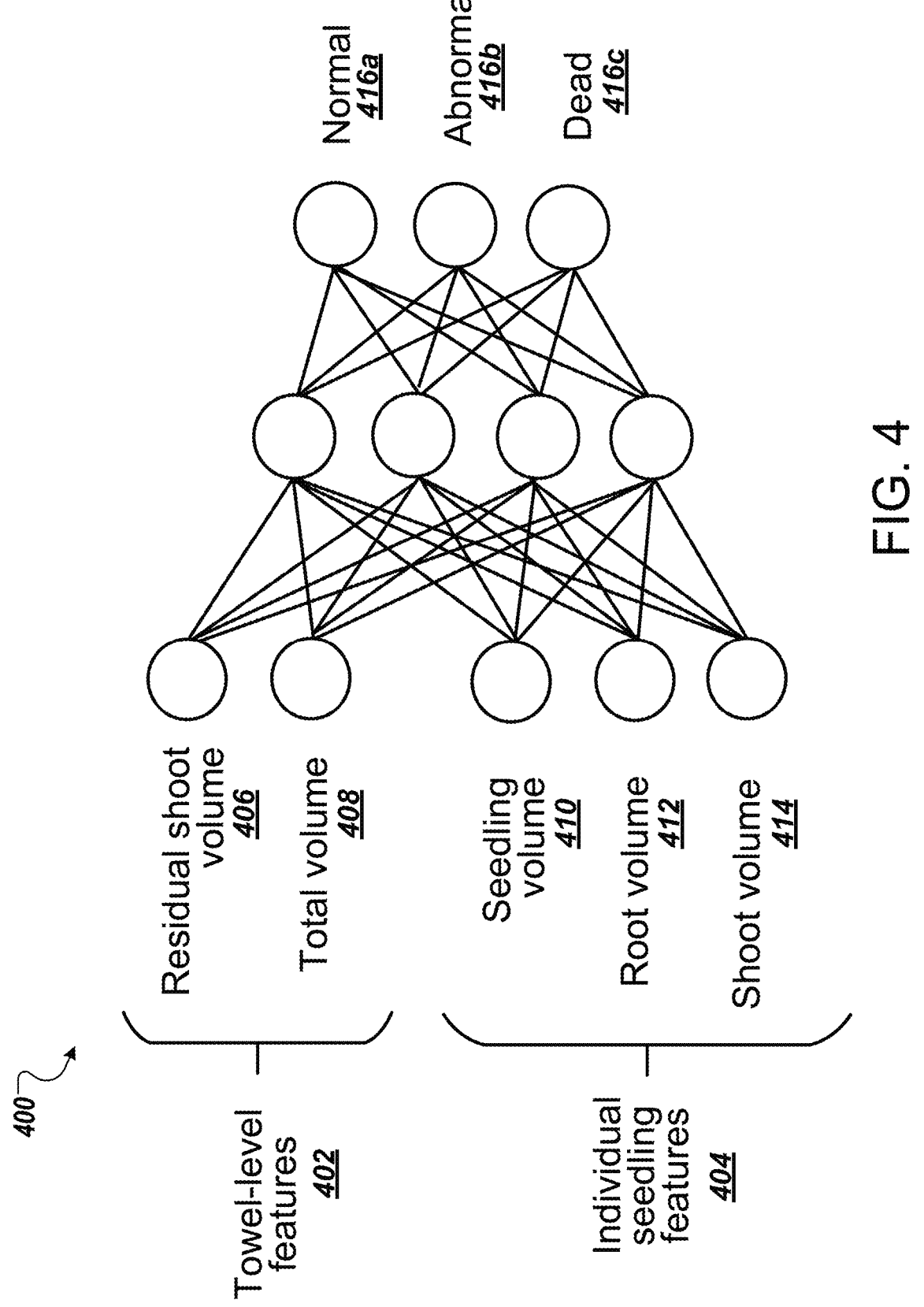
FIG. 4 shows an example of a classifier.

FIG. 4 shows an example of a classifier 400, e.g., an example of the classifier 108 of FIG. 1A. In some implementations, the input to the classifier can include seedling-level features, such as individual seedling features 404 for each likely seedling. In some implementations, the seedling-level features, such as the individual seedling features 404 can include a dimensional property of the likely seedling, a dimensional property of a likely root of the likely seedling, a dimensional property of a likely shoot of the likely seedling, a dimensional property of a likely seed of the likely seedling, or any combination of these. In some implementations, the system can determine a likely shoot and a likely root of a likely seedling, e.g., based on growth direction, thickness, etc. Here, the dimensional property can be volume, mass, length, thickness, or another dimension property of the likely shoots and roots, or the likely seedling. For example, the individual seedling features 404 for a likely seedling can include seedling volume 410 of the likely seedling, root volume 412 of the likely seedling, and shoot volume 414 of the likely seedling.

In some implementations, the input to the classifier can include both the seedling-level features, such as the individual seedling features 404 and towel-level features 402 of the likely seedlings in the germination towel. In some implementations, the system can classify the germination towel using the classifier trained to use both the likely seedlings, plus any of the likely seeds or the likely shoots and roots that were not grouped into the likely seedlings, as the input. Using the towel-level features, the system can improve the performance of the classifier because the towel-level features can provide context of the seedlings in the germination towel.

In some implementations, the towel-level features 402 can include a towel-level dimensional property of all of the likely seeds and all of the likely shoots and roots in the CT data. For example, the towel-level dimensional property of all of the likely seeds and all of the likely shoots and roots in the CT data can include the total volume 408 of all of the likely seeds and all of the likely shoots and roots in the CT data. For example, some of the likely shoots and roots may not be assembled into a likely seedling, but the dimensional property of these likely shoots and roots is provided as input to the classifier.

In some implementations, the towel-level features can include a towel-level dimensional property of any of the likely seeds or the likely shoots and roots that were not grouped (e.g., assembled) into the likely seedlings. For example, the towel-level dimensional property of any of the likely seeds or the likely shoots and roots that were not grouped into the likely seedlings can include a volume 406 of the residual shoots, residual roots, or both.

In some implementations, the towel-level features can include both the towel-level dimensional property of all of the likely seeds and all of the likely shoots and roots in the CT data, and the towel-level dimensional property of any of the likely seeds or the likely shoots and roots that were not grouped into the likely seedlings. For example, the towel-level features can include the residual shoots and roots volume 406 and the total volume 408.

The classifier can include any suitable model types or architectures. In some implementations, the classifier can be a linear classifier, a nonlinear classifier, a random forest classifier, a Support Vector Machine (SVM) classifier, a machine learning classifier, or a combination of these. In some implementations, the classifier can be a multilayer perceptron classifier, as shown in FIG. 4. The multilayer perceptron classifier can include an input layer, a hidden layer, and an output layer. In some implementations, the classifier can have more than three layers.

For example, the input layer of the classifier 400 in FIG. 4 can include five values for five features: the towel-level features 406 and 408, and the seedling-level features 410, 412, and 414. The hidden layer can be a fully connected layer that processes the five values to generate four values. The output layer can be another fully connected layer that processes the four values to generate three values. The three values can be scores indicating likelihoods that a likely seedling belongs to each germination category of the plurality of categories. For example, the three values generated from the output layer can include scores for normal 416a, abnormal 416b, and dead 416c.

FIG. 5A is a flowchart showing an example of a process 500a to classify a germination towel. In some implementations, the system can generate (504) a predicted category of germination categories (e.g., normal, abnormal, and dead) for each likely seedling using the classifier. For example, the predicted category can be the category having the largest class score or probability. In some implementations, the system can compute (506) the classification result including a count of the seedlings in the germination towel that are predicted to belong to each category of the germination categories.

In some implementations, the system can produce (508) a count of predicted normal seedlings in the germination towel. In some implementations, the system can calculate (510) a germination rate for the germination towel using the count of the predicted normal seedlings. For example, the system can calculate the germination rate by dividing the count of the predicted normal seedlings by the total number of seeds in the towel.

In some implementations, the system can use another process to classify a germination towel. FIG. 5B is a flowchart showing an example of a process 500b to classify a germination towel. In some implementations, the system can generate (512), for each likely seedling and for each germination category, a score for the germination category using the classifier. The score can indicate a likelihood that the seedling belongs to the germination category. The system can generate (514), for the germination towel, an aggregated score for each germination category by aggregating the scores for the germination category for the likely seedlings in the germination towel. For example, the system can sum up the class probabilities for all likely seedlings in the towel. The system can compute (516) the classification result for the germination towel by computing, using the aggregated scores, a predicted count of the seedlings in the germination towel that belong to each category of the germination categories. For example, the system can map the aggregated scores to counts for the germination categories. More details are described in connection with FIG. 1. In some implementations, the system can calculate (518) a germination rate for the germination towel using the predicted count of the seedlings in the germination towel that belong to the normal category.

In some implementations, the classifier can include a machine learning model and the system 100, or another system, can perform the training of the classifier. Referring to FIG. 5A, the system can train (502) the classifier on training data. The training of the classifier also applies to the classifier described in connection with FIG. 5B. In some implementations, the system can train the classifier using a supervised learning method on training data that includes seedling-level category labels. In some implementations, the system can obtain training data that includes seedling-level category labels. For example, the training data can include a category label for each seedling in a germination towel.

In some implementations, the system can train the classifier using a weakly supervised learning method. In some cases, a category for each individual seedling is unknown or cannot be easily obtained, making seedling-level supervised training impractical for training the classifier. Towel-level counts of categories (e.g., normal, abnormal, and dead) per towel, are available and can provide a population-level supervision signal. In some implementations, the system can obtain training data that includes towel-level labels. The towel-level labels for a germination towel can include a count of seedlings in the germination towel that belong to each germination category of a plurality of germination categories. For example, the towel-level label for a germination towel can include a count of normal seedlings, a count of abnormal seedlings, and a count of dead seedlings in the germination towel. Existing seed quality systems use trained human analysts to provide the towel-level labels. These systems do not provide seedling-level labels. By training the classifier on training data having the towel-level labels, the system can reduce the time and effort needed to acquire labeled training data, while maintaining at least similar accuracy as the accuracy of using seedling-level labels.

In some implementations, the system can train (502) the seedling classifier on samples using a loss function. The loss function can measure a difference between a predicted count of seedlings per category generated from processing the samples representing one or more training germination towels and a ground truth count of seedlings belonging to each category for the one or more training germination towels.

For example, the loss function can be a towel-level loss function. The towel-level loss function can be the square of the differences between the predicted rates of each of three germination categories and the true rates. A predicted rate is the predicted count divided by the total number of seeds in a germination towel. In some implementations, the towel-level loss function can be the square of the differences between the predicted rates of each of three germination categories and the true rates, divided by the variance of these rates. The loss function can be the average (or sum) of all these ratios over multiple germination towels. In some implementations, the variance can be the variance of a binomial variable with the mean taken as the average of predicted rates and true rates.

In some implementations, the loss function can be based on a tolerance value for a difference between predicted germination rates produced by two human readers. In some implementations, the variance in the loss function can be a tolerance value for a difference between predicted germination rates produced by two human readers. In statistical analysis, a tolerance value can be used to determine whether two trained human analysts produce essentially the same result when they go through the manual processes of reading a towel (e.g., manually classifying all the seeds in the towel). Whether or not two results produced by two trained human analysts agree can be a function of the predicted germination rate of the towel. For example, the tolerance value can be smaller towards the two ends, e.g., when the germination rate is higher than 85%, or is lower than 15%. Towards the middle (e.g., the germination rate being around 50%), the tolerance value can have a wider tolerance band than towards the two ends. That is, towards the middle, two results can be more different from each other and can be still in agreement statistically. The loss function can be based on a tolerance value similar to the tolerance value used to determine whether two trained human analysts produce the same result. Thus, once trained, the classifier can have a performance at least similar to a trained human analyst.

Referring to FIG. 3, the system provides (314) a classification result from the classifying for the germination towel. For example, the system can provide the classification result to a downstream system for further processing. More details are described herein in connection with FIG. 1A.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as a hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media, and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desired results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

EXAMPLES

Although the present application is defined in the attached claims, it should be understood that the present invention can also (additionally or alternatively) be defined in accordance with the following examples:

Example 1: A method comprising:

obtaining computed tomography data representing a germination towel comprising seedlings;

detecting likely seeds and candidate shoots and roots in the computed tomography data representing the germination towel;

forming segments from the candidate shoots and roots;

grouping the segments across a total volume of the computed tomography data into likely shoots and roots in accordance with relative proximity and alignment of the segments;

assembling the likely seeds and the likely shoots and roots into likely seedlings;

classifying the germination towel using a classifier trained to use at least the likely seedlings, as input; and providing a classification result from the classifying for the germination towel.

Example 2: The method of Example 1: wherein forming the segments from the candidate shoots and roots comprises: forming the segments from the candidate shoots and roots within discrete partitions of the total volume of the computed tomography data, wherein a size of the discrete partitions is determined in accordance with a dimensional property associated with shoots and roots of the seedlings.

Example 3: The method of Example 2: wherein the size of the discrete partitions is determined in accordance with the dimensional property comprising an expected size and an expected curvature associated with the shoots and roots of the seedlings.

Example 4: The method of Example 2: wherein the size of the discrete partitions is determined in accordance with a range of curvatures allowed by one or more quadratic splines that are used to form the segments within the discrete partitions.

Example 5: The method of any one of the previous Examples: wherein the detecting comprises:

identifying centers of the candidate shoots and roots by processing the computed tomography data using a blob detection algorithm.

Example 6: The method of any one of the previous Examples: wherein the identifying comprises:

downsampling the computed tomography data representing the germination towel to generate downsampled computed tomography data; and processing the downsampled computed tomography data using the blob detection algorithm to identify the centers of the candidate shoots and roots.

Example 7: The method of any one of the previous Examples, wherein the identifying comprises:

convolving data derived from the computed tomography data using a kernel function to generate convolved computed tomography data, wherein a shape of the kernel function is determined in accordance with a dimensional property associated with the shoots and roots of the seedlings;

computing a Hessian matrix for each voxel of the data derived from the computed tomography data;

computing a Laplacian for each voxel of the data derived from the computed tomography data using the Hessian matrix;

selecting voxels of interest using at least the Laplacian for each voxel; and determining the centers of the candidate shoots and roots using the voxels of interest.

Example 8: The method of any one of the previous Examples, wherein a magnitude of the Laplacian for each voxel of the voxels of interest is greater than a threshold value, and a value for each voxel of the voxels of interest in the convolved computed tomography data is with a range determined in accordance with a density property associated with the shoots and roots of the seedlings.

Example 9: The method of any one of the previous Examples, wherein the Laplacian for each voxel of the voxels of interest is at a local minimum in at least two principal directions.

Example 10: The method of any one of the previous Examples, wherein determining the centers of the candidate shoots and roots using the voxels of interest comprises:

computing eigenvalues of the Hessian matrix for each voxel of the voxels of interest; and identifying, as the centers of the candidate shoots and roots, a subset of voxels from the voxels of interest, wherein each voxel in the subset of voxels has two prominent eigenvalues in directions that are perpendicular to an axis of the candidate shoots and roots, wherein the two prominent eigenvalues are below a predetermined negative value.

Example 11: The method of any one of the previous Examples, wherein determining the centers of the candidate shoots and roots using the voxels of interest comprises:

determining a profile for the candidate shoots and roots by sampling the data derived from the computed tomography data along two directions represented by the two prominent eigenvalues.

Example 12: The method of any one of the previous Examples, wherein the classifying comprises:

classifying the germination towel using the classifier trained to use both the likely seedlings, plus any of the likely seeds or the likely shoots and roots that were not grouped into the likely seedlings, as the input.

Example 13: The method of any one of the previous Examples, wherein the input to the classifier comprises: (i) a dimensional property of the likely seedling, (ii) a dimensional property of a likely root of the likely seedling, (iii) a dimensional property of a likely shoot of the likely seedling, (iv) a towel-level dimensional property of all of the likely seeds and all of the likely shoots and roots in the computed tomography data, and (v) a towel-level dimensional property of any of the likely seeds or the likely shoots and roots that were not grouped into the likely seedlings.

Example 14: The method of any one of the previous Examples, wherein the classifying comprises:

generating a predicted category of germination categories for each likely seedling using the classifier; and computing the classification result comprising a count of the seedlings in the germination towel that are predicted to belong to each category of the germination categories.

Example 15: The method of any one of the previous Examples, wherein the classifying comprises:

producing a count of predicted normal seedlings in the germination towel; and calculating a germination rate for the germination towel using the count of the predicted normal seedlings.

Example 16: The method of any one of the previous Examples, wherein the classifying comprises:

generating, for each likely seedling and for each germination category, a score for the germination category using the classifier, wherein the score indicates a likelihood that the seedling belongs to the germination category;

generating, for the germination towel, an aggregated score for each germination category by aggregating the scores for the germination category for the likely seedlings in the germination towel; and computing the classification result comprising computing, using the aggregated scores, a predicted count of the seedlings in the germination towel that belong to each category of the germination categories.

Example 17: The method of any one of the previous Examples, comprising:

training the classifier on samples using a loss function that measures a difference between a predicted count of seedlings per category generated from processing the samples representing one or more training germination towels and a ground truth count of seedlings belonging to each category for the one or more training germination towels, wherein the loss function is based on a tolerance value for a difference between predicted germination rates produced by two human readers.

Similar operations and processes as described in Examples 1 to 17 can be performed in a system comprising a data processing apparatus including at least one hardware processor and a non-transitory computer-readable medium encoding instructions configured to cause the data processing apparatus to perform the operations. Further, a non-transitory computer-readable medium encoding instructions operable to cause data processing apparatus to perform the operations as describes in any one of the Examples 1 to 17 can also be implemented.

What is claimed is:

1. A method comprising:

obtaining computed tomography data representing a germination towel comprising seedlings;

detecting likely seeds and candidate shoots and roots in the computed tomography data representing the germination towel;

forming segments from the candidate shoots and roots, the segments being specified in the computed tomography data using segmentation masks or bounding boxes;

grouping the segments across a total volume of the computed tomography data into likely shoots and roots in accordance with relative proximity and alignment of the segments;

assembling the likely seeds and the likely shoots and roots into likely seedlings;

classifying the germination towel using a classifier trained to use at least the likely seedlings, as input; and providing a classification result from the classifying for the germination towel.

2. The method of claim 1, wherein forming the segments from the candidate shoots and roots comprises: forming the segments from the candidate shoots and roots within discrete partitions of the total volume of the computed tomography data, wherein a size of the discrete partitions is determined in accordance with a dimensional property associated with shoots and roots of the seedlings.

3. The method of claim 2, wherein the size of the discrete partitions is determined in accordance with the dimensional property comprising an expected size and an expected curvature associated with the shoots and roots of the seedlings.

4. The method of claim 2, wherein the size of the discrete partitions is determined in accordance with a range of curvatures allowed by one or more quadratic splines that are used to form the segments within the discrete partitions.

5. The method of claim 1, wherein the detecting comprises:

identifying centers of the candidate shoots and roots by processing the computed tomography data using a blob detection algorithm.

6. The method of claim 5, wherein the identifying comprises:

downsampling the computed tomography data representing the germination towel to generate downsampled computed tomography data; and processing the downsampled computed tomography data using the blob detection algorithm to identify the centers of the candidate shoots and roots.

7. The method of claim 5, wherein the identifying comprises:

convolving data derived from the computed tomography data using a kernel function to generate convolved computed tomography data, wherein a shape of the kernel function is determined in accordance with a dimensional property associated with the shoots and roots of the seedlings;

computing a Hessian matrix for each voxel of the data derived from the computed tomography data;

computing a Laplacian for each voxel of the data derived from the computed tomography data using the Hessian matrix;

selecting voxels of interest using at least the Laplacian for each voxel; and determining the centers of the candidate shoots and roots using the voxels of interest.

8. The method of claim 7, wherein a magnitude of the Laplacian for each voxel of the voxels of interest is greater than a threshold value, and a value for each voxel of the voxels of interest in the convolved computed tomography data is with a range determined in accordance with a density property associated with the shoots and roots of the seedlings.

9. The method of claim 7, wherein the Laplacian for each voxel of the voxels of interest is at a local minimum in at least two principal directions.

10. The method of claim 7, wherein determining the centers of the candidate shoots and roots using the voxels of interest comprises:

computing eigenvalues of the Hessian matrix for each voxel of the voxels of interest; and identifying, as the centers of the candidate shoots and roots, a subset of voxels from the voxels of interest, wherein each voxel in the subset of voxels has two prominent eigenvalues in directions that are perpendicular to an axis of the candidate shoots and roots, wherein the two prominent eigenvalues are below a predetermined negative value.

11. The method of claim 10, wherein determining the centers of the candidate shoots and roots using the voxels of interest comprises:

determining a profile for the candidate shoots and roots by sampling the data derived from the computed tomography data along two directions represented by the two prominent eigenvalues.

12. The method of claim 1, wherein the classifying comprises:

classifying the germination towel using the classifier trained to use both the likely seedlings, plus any of the likely seeds or the likely shoots and roots that were not grouped into the likely seedlings, as the input.

13. The method of claim 1, wherein the input to the classifier comprises: (i) a dimensional property of the likely seedling, (ii) a dimensional property of a likely root of the likely seedling, (iii) a dimensional property of a likely shoot of the likely seedling, (iv) a towel-level dimensional property of all of the likely seeds and all of the likely shoots and roots in the computed tomography data, and (v) a towel-level dimensional property of any of the likely seeds or the likely shoots and roots that were not grouped into the likely seedlings.

14. The method of claim 1, wherein the classifying comprises:

generating a predicted category of germination categories for each likely seedling using the classifier; and computing the classification result comprising a count of the seedlings in the germination towel that are predicted to belong to each category of the germination categories.

15. The method of claim 14, wherein the classifying comprises:

producing a count of predicted normal seedlings in the germination towel; and calculating a germination rate for the germination towel using the count of the predicted normal seedlings.

16. The method of claim 1, wherein the classifying comprises:

generating, for each likely seedling and for each germination category, a score for the germination category using the classifier, wherein the score indicates a likelihood that the seedling belongs to the germination category;

generating, for the germination towel, an aggregated score for each germination category by aggregating the scores for the germination category for the likely seedlings in the germination towel; and computing the classification result comprising computing, using the aggregated scores, a predicted count of the seedlings in the germination towel that belong to each category of the germination categories.

17. The method of claim 1, comprising:

training the classifier on samples using a loss function that measures a difference between a predicted count of seedlings per category generated from processing the samples representing one or more training germination towels and a ground truth count of seedlings belonging to each category for the one or more training germination towels, wherein the loss function is based on a tolerance value for a difference between predicted germination rates produced by two human readers.

18. A system comprising:

a data processing apparatus including at least one hardware processor; and a non-transitory computer-readable medium encoding instructions configured to cause the data processing apparatus to perform operations comprising:

obtaining computed tomography data representing a germination towel comprising seedlings;

detecting likely seeds and candidate shoots and roots in the computed tomography data representing the germination towel;

forming segments from the candidate shoots and roots, the segments being specified in the computed tomography data using segmentation masks or bounding boxes;

grouping the segments across a total volume of the computed tomography data into likely shoots and roots in accordance with relative proximity and alignment of the segments;

assembling the likely seeds and the likely shoots and roots into likely seedlings;

classifying the germination towel using a classifier trained to use at least the likely seedlings, as input; and providing a classification result from the classifying for the germination towel.

19. The system of claim 18, wherein forming the segments from the candidate shoots and roots comprises: forming the segments from the candidate shoots and roots within discrete partitions of the total volume of the computed tomography data, wherein a size of the discrete partitions is determined in accordance with a dimensional property associated with shoots and roots of the seedlings.

20. The system of claim 19, wherein the size of the discrete partitions is determined in accordance with the dimensional property comprising an expected size and an expected curvature associated with the shoots and roots of the seedlings.

21. The system of claim 19, wherein the size of the discrete partitions is determined in accordance with a range of curvatures allowed by one or more quadratic splines that are used to form the segments within the discrete partitions.

22. The system of claim 18, wherein the detecting comprises:

identifying centers of the candidate shoots and roots by processing the computed tomography data using a blob detection algorithm.

23. The system of claim 22, wherein the identifying comprises:

downsampling the computed tomography data representing the germination towel to generate downsampled computed tomography data; and processing the downsampled computed tomography data using the blob detection algorithm to identify the centers of the candidate shoots and roots.

24. A system comprising:

a data processing apparatus including at least one hardware processor; and a non-transitory computer-readable medium encoding instructions configured to cause the data processing apparatus to perform operations comprising:

obtaining computed tomography data representing a germination towel comprising seedlings;

detecting likely seeds and candidate shoots and roots in the computed tomography data representing the germination towel;

forming segments from the candidate shoots and roots;

grouping the segments across a total volume of the computed tomography data into likely shoots and roots in accordance with relative proximity and alignment of the segments;

assembling the likely seeds and the likely shoots and roots into likely seedlings;

classifying the germination towel using a classifier trained to use at least the likely seedlings, as input; and providing a classification result from the classifying for the germination towel, wherein the detecting comprises:

identifying centers of the candidate shoots and roots by processing the computed tomography data using a blob detection algorithm, wherein the identifying comprises:

convolving data derived from the computed tomography data using a kernel function to generate convolved computed tomography data, wherein a shape of the kernel function is determined in accordance with a dimensional property associated with the shoots and roots of the seedlings;

computing a Hessian matrix for each voxel of the data derived from the computed tomography data;

computing a Laplacian for each voxel of the data derived from the computed tomography data using the Hessian matrix;

selecting voxels of interest using at least the Laplacian for each voxel; and determining the centers of the candidate shoots and roots using the voxels of interest.

25. The system of claim 18, wherein the classifying comprises:

classifying the germination towel using the classifier trained to use both the likely seedlings, plus any of the likely seeds or the likely shoots and roots that were not grouped into the likely seedlings, as the input.

26. The system of claim 18, wherein the input to the classifier comprises: (i) a dimensional property of the likely seedling, (ii) a dimensional property of a likely root of the likely seedling, (iii) a dimensional property of a likely shoot of the likely seedling, (iv) a towel-level dimensional property of all of the likely seeds and all of the likely shoots and roots in the computed tomography data, and (v) a towel-level dimensional property of any of the likely seeds or the likely shoots and roots that were not grouped into the likely seedlings.

27. The system of claim 18, wherein the classifying comprises:

generating a predicted category of germination categories for each likely seedling using the classifier; and computing the classification result comprising a count of the seedlings in the germination towel that are predicted to belong to each category of the germination categories.

28. The system of claim 18, wherein the classifying comprises:

generating, for each likely seedling and for each germination category, a score for the germination category using the classifier, wherein the score indicates a likelihood that the seedling belongs to the germination category;

generating, for the germination towel, an aggregated score for each germination category by aggregating the scores for the germination category for the likely seedlings in the germination towel; and computing the classification result comprising computing, using the aggregated scores, a predicted count of the seedlings in the germination towel that belong to each category of the germination categories.

29. The system of claim 18, the operations comprising:

training the classifier on samples using a loss function that measures a difference between a predicted count of seedlings per category generated from processing the samples representing one or more training germination towels and a ground truth count of seedlings belonging to each category for the one or more training germination towels, wherein the loss function is based on a tolerance value for a difference between predicted germination rates produced by two human readers.

30. A non-transitory computer-readable medium encoding instructions operable to cause data processing apparatus to perform operations comprising:

obtaining computed tomography data representing a germination towel comprising seedlings;

detecting likely seeds and candidate shoots and roots in the computed tomography data representing the germination towel;

forming segments from the candidate shoots and roots;

grouping the segments across a total volume of the computed tomography data into likely shoots and roots in accordance with relative proximity and alignment of the segments;

assembling the likely seeds and the likely shoots and roots into likely seedlings;

classifying the germination towel using a classifier trained to use at least the likely seedlings, as input; and providing a classification result from the classifying for the germination towel, wherein the detecting comprises:

convolving data derived from the computed tomography data using a kernel function to generate convolved computed tomography data, wherein a shape of the kernel function is determined in accordance with a dimensional property associated with the shoots and roots of the seedlings; and identifying centers of the candidate shoots and roots using the convolved computed tomography data.

* * * * *